No. 785,767. PATENTED MAR. 28, 1905.
W. C. SCHOELKOPF.
SHAFT AND PLUNGER CONNECTION.
APPLICATION FILED SEPT. 28, 1904.

Witnesses
A. R. Walton
Geo. E. Few

Inventor
William C. Schoelkopf
by
Milo B. Stevens & Co.
Attorneys

No. 785,767. Patented March 28, 1905.

UNITED STATES PATENT OFFICE.

WILLIAM C. SCHOELKOPF, OF MADISON, WISCONSIN.

SHAFT AND PLUNGER CONNECTION.

SPECIFICATION forming part of Letters Patent No. 785,767, dated March 28, 1905.

Application filed September 26, 1904. Serial No. 226,095.

*To all whom it may concern:*

Be it known that I, WILLIAM C. SCHOELKOPF, a citizen of the United States, residing at Madison, in the county of Dane and State of Wisconsin, have invented new and useful Improvements in Shaft and Plunger Connections, of which the following is a specification.

This invention is a device for regulating the length of stroke of a reciprocating element—such as a pump-plunger, a piston, or the like—driven by a rotating element, such as an eccentric or crank. It is particularly applicable and useful for regulating the length of stroke of plungers in oil-pumps and force-feed lubricators. Instead of having a fixed connection between the plunger and the crank or eccentric-strap a slot is made in the head of the plunger or reciprocating rod, in which slot the crank-pin or the eccentric-strap pin is movable to lose part or all of its motion, thus decreasing the length of stroke. The extent of this lost motion is limited by an adjusting-screw to the degree desired, and if a full stroke is wanted it can be effected by proper adjustment of said screw.

The invention is illustrated in the accompanying drawings, in which—

Figure 1:
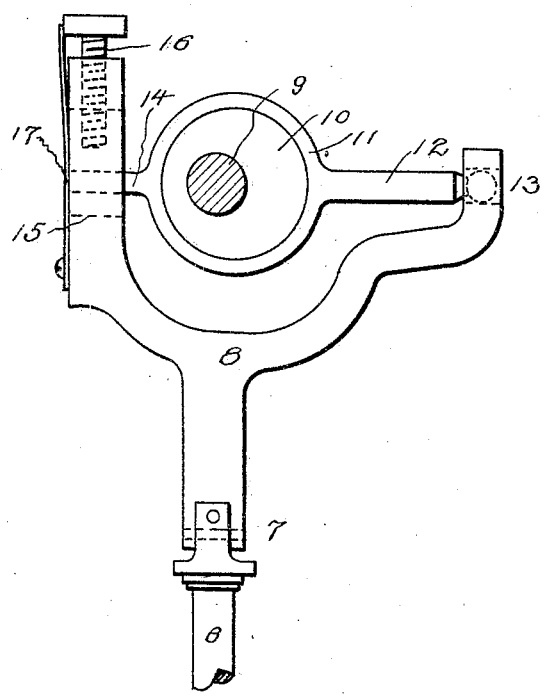
Figure 2:
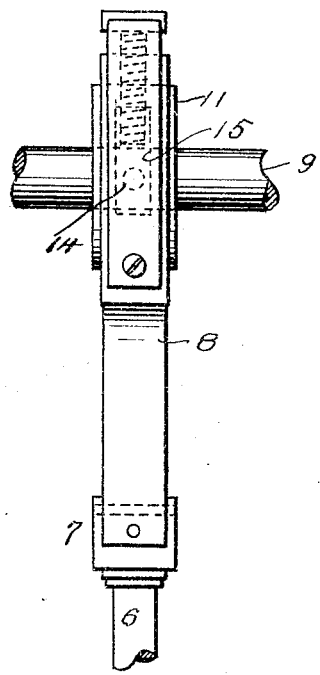
Figure 3:
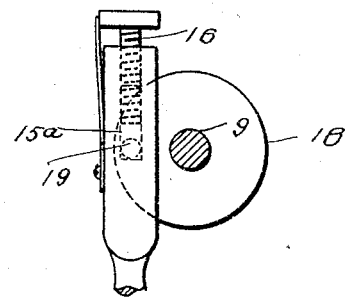

Figure 1 is a front elevation, and Fig. 2 is a side elevation, as applied to a plunger driven by an eccentric. Fig. 3 is a side elevation of a modification, showing the invention applied to a crank-driven plunger.

Referring specifically to the drawings, 6 indicates a reciprocating element, such as a pump-plunger, having a flexible connection at 7 with a yoke 8. This flexible connection takes care of the lateral motion or oscillation and is particularly desirable in automobile work, where vibration tends to get the parts out of exact alinement. The drive-shaft is indicated at 9, carrying the eccentric 10. The eccentric-strap 11 has a projecting arm 12, which articulates by a ball-and-socket joint at 13 with one branch of the yoke 8. Projecting from the eccentric-strap on the side opposite to the arm 13 is a pin 14, which extends into a slot 15, produced in the other branch of the yoke. The slot extends in alinement with the line of reciprocation of the eccentric-strap and plunger, and the pin is slidable in the slot to the extent permitted by a square-headed adjusting-screw 16, which is tapped into the end of the branch of the yoke. A flat spring 17 bears against the head of the screw and holds it as adjusted; but the spring is flexible enough to give when the screw is turned by force.

When the eccentric-strap is vibrated by rotation of the shaft, the plunger will lose motion until the pin strikes either the bottom of the slot or the foot of the adjusting-screw, and when it does so strike the plunger will reciprocate accordingly, and the extent of this lost motion will be variable, according to the position of the adjusting-screw, to any degree between the loss of all motion and the full throw of the eccentric.

It is noticeable in the construction shown in Figs. 1 and 2 that the ball-and-socket joint 13 and the loose fit of the pin 14 in the slot allow a swing on a transverse axis, accommodating any variation in angle between the axis of the plunger and the axis of the shafts due to vibration or otherwise.

In a modification shown in Fig. 3 a crank-disk 18 is mounted on the shaft 9 instead of the eccentric shown in the other figures. The crank-pin 19 of this disk fits in the slot 15ª, and by means of the adjusting-screw 16 the length of stroke is varied as desired.

What I claim as new, and desire to secure by Letters Patent, is—

1. The combination with a shaft and an eccentric and its strap thereon, of a reciprocating element, and a connecting member pivoted to the said element and to the eccentric-strap, the pivotal connection between said member and strap being adjustable to vary the stroke of said element.

2. The combination with a shaft, and a reciprocating element driven thereby, of a flexible connection therebetween adjustable to vary the length of stroke of the latter and having vibration or oscillation in a plane parallel to the axis of the shaft.

3. The combination with a shaft, of a reciprocating element, having a slot at the head thereof, a device for converting the rotary motion of the shaft into reciprocating motion, having a pin working in said slot, to lose motion, and means to vary the length of the slot, to change the amount of lost motion.

4. The combination with a shaft, and a reciprocating element driven thereby, of a device between the former and the latter, constructed to convert and transmit the motion, and to produce lost motion, and means to vary the amount of such lost motion.

5. The combination with a shaft, and an eccentric thereon, of a reciprocating element having a yoke at the head thereof, and an eccentric-strap on the eccentric, pivoted between the branches of the yoke, to permit variation in the angle between the shaft and said element.

6. The combination with a shaft and an eccentric thereon, of a reciprocating element, a yoke flexibly joined thereto, and a strap on the eccentric, pivoted to and extending between the branches of the yoke.

7. The combination with a shaft and a reciprocating element, of a yoke connected to the latter and having a slot in one of its branches, an eccentric and its strap between the shaft and the yoke, the eccentric-strap being pivoted to one branch of the yoke and having a pin slidable in the said slot in the other.

8. The combination with a shaft and a reciprocating element, of a yoke connected to the latter, an eccentric and its strap between the shaft and yoke, the eccentric-strap being pivoted to one branch of the yoke and having a slot-and-pin connection with the other, permitting lost motion, by slide of the pin in the slot and means to vary the extent of said slide.

9. The combination with a shaft and a reciprocating element, of a yoke pivotally connected to the latter and having a slot in one of its branches, an eccentric and its strap on the shaft, the strap having a universal joint with one branch of the yoke and a pin slidable in the slot in the other, and an adjusting-screw extending into the slot, to vary the extent of said slide.

In testimony whereof I have signed my name to this specification in the presence of two subscribing witnesses.

WILLIAM C. SCHOELKOPF.

Witnesses:
   PAUL F. NIEBUHR,
   JNO. J. PASCHKE.